US008824036B2

(12) United States Patent
Manipatruni et al.

(10) Patent No.: US 8,824,036 B2
(45) Date of Patent: Sep. 2, 2014

(54) APPARATUS AND METHODS FOR WIDE TEMPERATURE RANGE OPERATION OF MICROMETER-SCALE SILICON ELECTRO-OPTIC MODULATORS

(75) Inventors: Sasikanth Manipatruni, Hillsboro, OR (US); Rajeev Dokania, Hillsboro, OR (US); Alyssa B. Apsel, Ithaca, NY (US); Michal Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 303 days.

(21) Appl. No.: 13/257,295

(22) PCT Filed: Mar. 19, 2010

(86) PCT No.: PCT/US2010/027967
§ 371 (c)(1),
(2), (4) Date: Nov. 22, 2011

(87) PCT Pub. No.: WO2010/108093
PCT Pub. Date: Sep. 23, 2010

(65) Prior Publication Data
US 2012/0062974 A1 Mar. 15, 2012

Related U.S. Application Data

(60) Provisional application No. 61/161,871, filed on Mar. 20, 2009.

(51) Int. Cl.
*G02F 1/01* (2006.01)
*G02F 1/03* (2006.01)
*G02F 1/07* (2006.01)
*G02B 6/26* (2006.01)

(52) U.S. Cl.
USPC ........... 359/239; 359/245; 359/248; 359/249; 359/254; 359/278; 359/315; 359/320; 385/30; 385/39

(58) Field of Classification Search
USPC ......... 359/239, 245, 247–249, 251, 252, 254, 359/260, 278, 315–318, 320; 385/2, 8, 9, 385/30, 39
See application file for complete search history.

(56) References Cited

U.S. PATENT DOCUMENTS

| 6,636,668 | B1 | 10/2003 | Al-Hemyari et al. | |
|---|---|---|---|---|
| 8,203,777 | B2 * | 6/2012 | Smith et al. | 359/239 |
| 8,564,869 | B1 * | 10/2013 | Mohageg et al. | 359/245 |
| 2003/0179787 | A1 * | 9/2003 | Woodley | 372/20 |
| 2005/0074209 | A1 | 4/2005 | Baumann et al. | |

OTHER PUBLICATIONS

Rabiei, P. et al., Polymer micro-ring filters and modulators, Journal of Lightware Technology, vol. 20 No. 11, 1968-1975, Nov. 2002.
Kang Sung Chul, International Search Report and Written Opinion of the International Searching Authority.

* cited by examiner

*Primary Examiner* — Evelyn A. Lester
(74) *Attorney, Agent, or Firm* — William Greener; Alek P. Szecsy; Bond, Schoeneck & King, PLLLC

(57) ABSTRACT

A thermally stabilized, high speed, micrometer-scale silicon electro-optic modulator is provided. Methods for maintaining desired temperatures in electro-optic modulators are also provided. The methods can be used to maintain high quality modulation in the presence of thermal variations from the surroundings. Direct current injection into the thermally stabilized electro-optic modulator is used to maintain the modulation performance of the modulator. The direct injected current changes the local temperature of the thermally stabilized electro-optic modulator to maintain its operation over a wide temperature range.

23 Claims, 12 Drawing Sheets

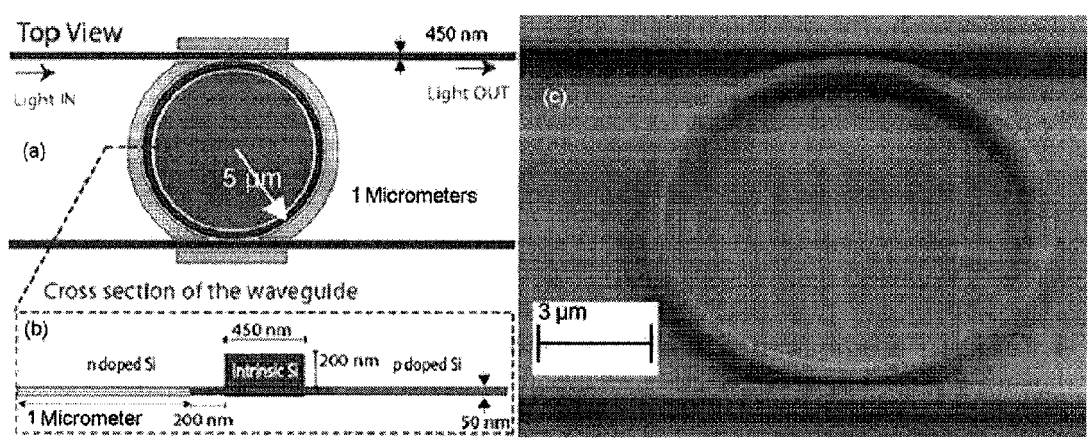
FIGS. 1a-c

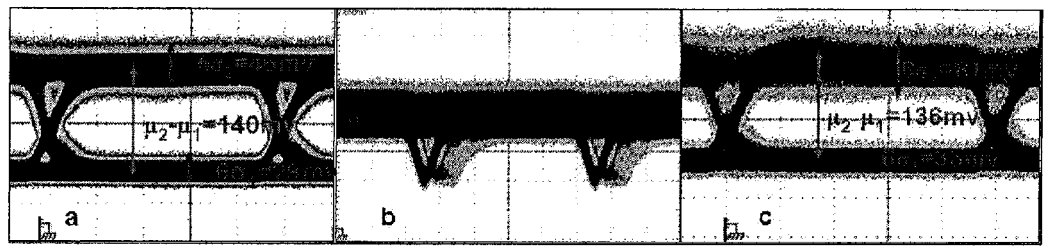
FIGS. 3a-c
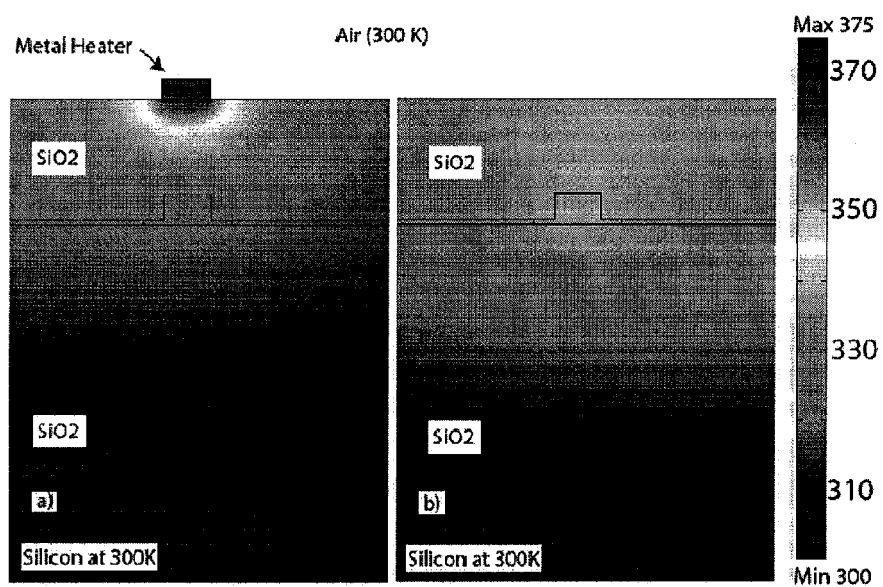
FIGS. 4a-b

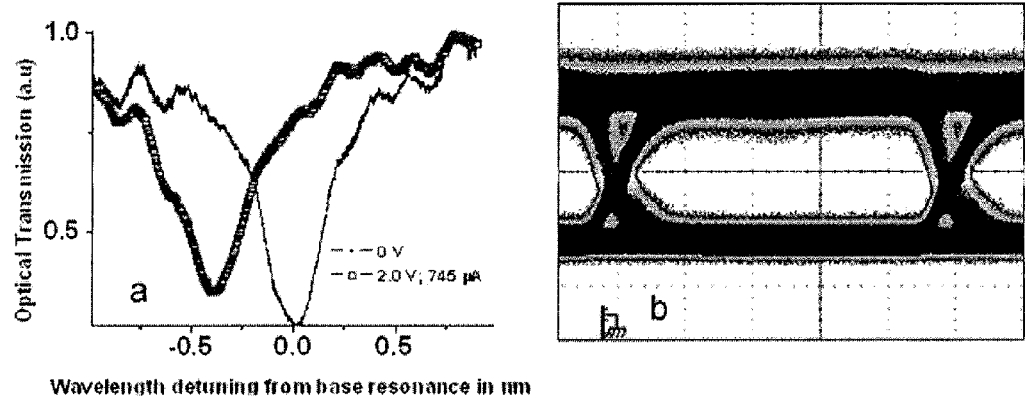
FIGS. 12a-b

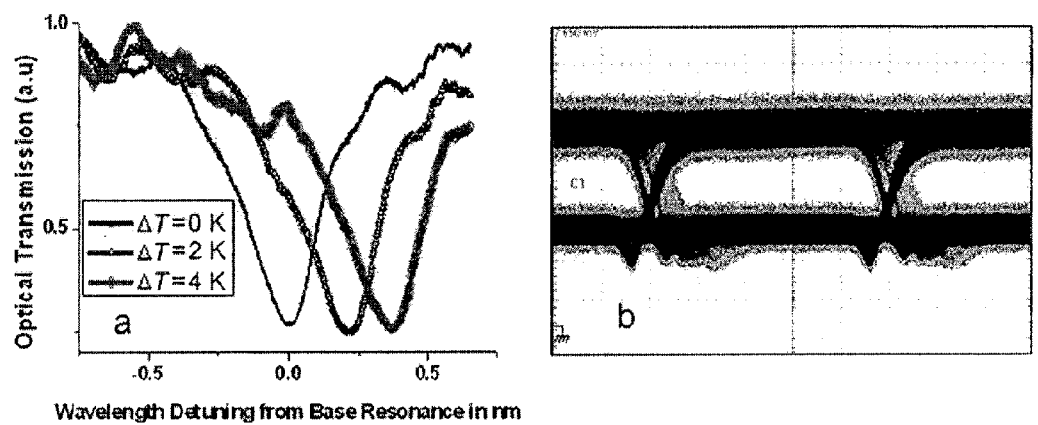
FIGS. 13a-b
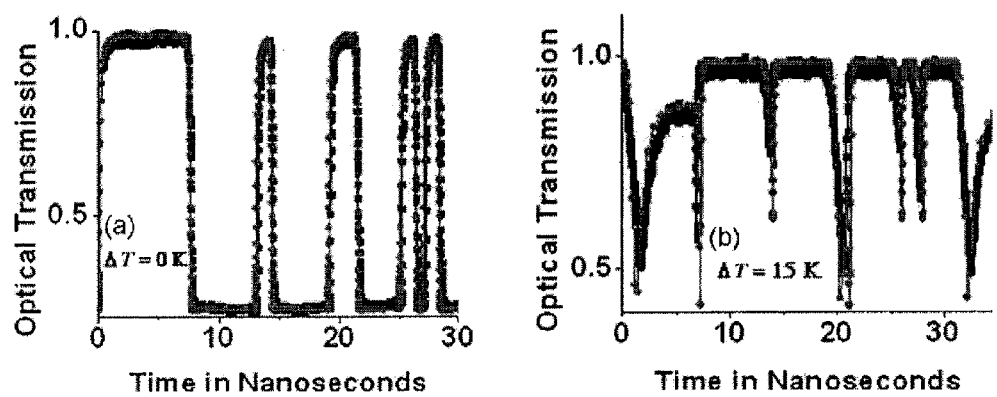
FIGS. 14a-b

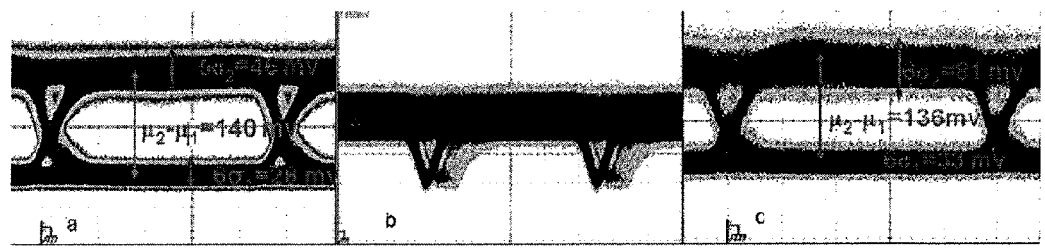
FIGS. 15a-c
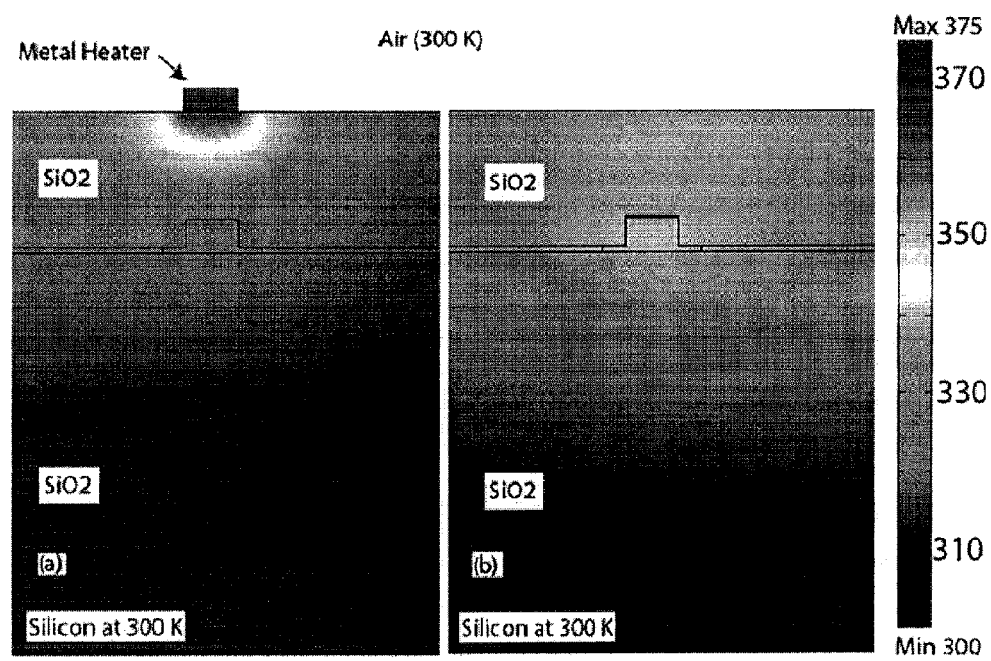
FIGS. 16a-b

APPARATUS AND METHODS FOR WIDE TEMPERATURE RANGE OPERATION OF MICROMETER-SCALE SILICON ELECTRO-OPTIC MODULATORS

CROSS-REFERENCE TO RELATED APPLICATIONS

This application claims priority to and the benefit of co-pending U.S. provisional patent application Ser. No. 61/161,871 entitled "Method and apparatus for wide temperature range operation of micrometer-scale silicon electro-optic modulators," by S. Manipatruni et al., filed Mar. 20, 2009, which is incorporated herein by reference in its entirety.

STATEMENT REGARDING FEDERALLY SPONSORED RESEARCH OR DEVELOPMENT

The disclosed invention was made with government support under contract no. W911NF-06-1-0057 from the Defense Advanced Research Projects Agency (DARPA), U.S. Army Research Office (ARO); contract no. W911NF-07-1-0652 from the U.S. Army Research Laboratory (ARL); and contract nos. 0446571 and 0347649 from the National Science Foundation CAREER Grant program. The government has rights in this invention.

TECHNICAL FIELD

The present invention relates to thermally stabilized, high speed, micrometer-scale silicon electro-optic modulators. The invention also relates to methods for fabricating thermally stabilized, high speed, micrometer-scale silicon electro-optic modulators. The invention further relates to methods for maintaining desired temperatures in electro-optic modulators.

BACKGROUND OF THE INVENTION

High-speed electro-optic modulation in silicon is a crucial technology for the integration of silicon photonics with microelectronics, and in particular, for overcoming the bandwidth limitations of metal interconnections. High-speed gigabits per second modulators have been demonstrated recently using either resonant structures (Q. Xu, B. Schmidt, S. Pradhan, and M. Lipson, Nature 435, 325 (2005); B. Schmidt, Q. Xu, J. Shakya, S. Manipatruni, and M. Lipson, Opt. Express 15, 3140 (2007); L. Zhou and A. W. Poon, Opt. Express 14, 6851 (2006)) or Mach-Zehnder interferometers (A. Liu, R. Jones, L. Liao, D. Samara-Rubio, D. Rubin, O. Cohen, R. Nicolaescu, and M. Paniccia, Nature 427, 615 (2004); S. J. Spector, M. W. Geis, G.-R. Zhou, M. E. Grein, F. Gan, M. A. Popovic, J. U. Yoon, D. M. Lennon, E. P. Ippen, F. Z. Kartner, and T. M. Lyszczarz, Opt. Express 16, 11027 (2008); W. M. Green, M. J. Rooks, L. Sekaric, and Y. A. Vlasov, Opt. Express 15, 17106 (2007)). Resonant electro-optic modulators are ideally suited for dense optical networks on chips due to their compact size, high extinction ratio (ER) per unit length, low insertion loss, and low power consumption. However, resonant electro-optic modulators suffer from temperature sensitivity owing to the relatively large thermo-optic effect in silicon (M. Lipson, IEEE J. Sel. Top. Quantum Electron. 12, 1520 (2006)).

Thus a chief drawback of current, art-known resonator-based silicon electro-optic modulators is that their performance is sensitive to thermal variations. There is therefore a need in the art for an apparatus and method for maintaining high quality electro-optic modulation in the presence of thermal variations from the surroundings.

Citation or identification of any reference in Section 2, or in any other section of this application, shall not be considered an admission that such reference is available as prior art to the present invention.

SUMMARY OF THE INVENTION

A thermally stabilized electro-optic modulator for maintaining a desired temperature is provided comprising:
a resonator-based electro-optic modulator;
a temperature sensing circuit that senses the temperature of the resonator-based electro-optic modulator and provides an output indicative of the temperature; and
a current controlling circuit that modulates current to the resonator-based electro-optic modulator, wherein the current controlling circuit is responsive to the output of the temperature sensing circuit.

In one embodiment, the current controlling circuit responds to the output of the temperature sensing circuit by increasing current as the temperature decreases to maintain the desired temperature or by decreasing current as the temperature increases to maintain the desired temperature.

In another embodiment, the thermally stabilized electro-optic modulator operates over temperature ranges of 10, 20, 30, 40, 50, 60, 70, 80, 90 or 100 K.

In another embodiment, the resonator-based electro-optic modulator comprises a ring or a disc resonator.

In another embodiment, the resonator-based electro-optic modulator comprises a Fabry Perot cavity.

In another embodiment, the thermally stabilized electro-optic modulator comprises a waveguide.

In another embodiment, the doping profile for the waveguide is a PIN junction.

In another embodiment, the doping profile for the waveguide is a PN, PINIP or NPIN junction.

In another embodiment, the current controlling circuit modulates current by controlling a DC bias current through the resonator-based electro-optic modulator.

In another embodiment, the thermally stabilized electro-optic modulator comprises a heat sink.

In another embodiment, the thermally stabilized electro-optic modulator comprises an electronic circuit that can change its averaged voltage.

A thermally stabilized electro-optic modulator is also provided wherein the thermally stabilized electro-optic modulator comprises:
a plurality of resonator-based electro-optic modulators;
a temperature sensing circuit that senses the temperature of each of the plurality of resonator-based electro-optic modulators and provides an output indicative of temperature; and
a current controlling circuit that modulates current to each resonator-based electro-optic modulator of the plurality, wherein the current controlling circuit responds to the output of the temperature sensing circuit.

In one embodiment, the plurality of resonator-based electro-optic modulators is a series of micro ring resonators of different radii, wherein the resonant wavelength of each micro ring resonator in the series is separated from the resonant wavelength of other micro ring resonators in the series by a wavelength that corresponds to a specified (or desired) increment of temperature change.

The thermally stabilized electro-optic modulator wherein the separating wavelength is 0.2 nm and the increment of temperature change is 20 K.

A method for fabricating a thermally stabilized electro-optic modulator is also provided. The method comprises the steps of:

provide a substrate;

forming a resonator-based electro-optic modulator on the substrate;

forming a temperature sensing circuit that senses the temperature of the resonator-based electro-optic modulator and provides an output indicative of the temperature, wherein the temperature sensing circuit is operatively connected to the resonator-based electro-optic modulator on the substrate; and forming a current controlling circuit on the substrate wherein the current controlling circuit modulates current to the resonator-based electro-optic modulator in response to output of the temperature sensing circuit.

In one embodiment, the A method for maintaining a desired temperature in an electro-optic modulator is also provided. The method comprises the steps of:

a) measuring the temperature of the electro-optic modulator;

b) comparing the measured temperature to the desired temperature; and c) modulating current through the electro-optic modulator.

In one embodiment, the step of modulating the current comprises:

increasing current through the electro-optic modulator, provided that the measured temperature is less than the desired temperature, or decreasing current through the electro-optic modulator provided that the measured temperature is greater than the desired temperature.

In another embodiment, steps a-c of the above method for maintaining a desired temperature are repeated at least once.

BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention.

FIGS. 1a-e. a) Schematic of the electro-optic ring modulator. b) Cross section of the waveguide embedded in a PIN (p-i-n) junction. c) Top-view scanning electron microscope (SEM) image of the ring resonator before the definition of doped regions and contacts. d) Top view schematic of the electro-optic ring modulator with electrode positions and control loop. e) Cross section of the waveguide with electrode positions.

FIGS. 3a-c. Optical transmission eye diagrams at various thermal and bias current conditions. Eye diagrams a) at $\Delta T=0$ K, 1.36 mA, b) degraded at $\Delta T=15$ K, 1.36 mA, c) retrieved at $\Delta T=15$ K, 345 μA.

FIGS. 4a-b. Temperature profiles using a) metal strip heater and b) direct localized waveguide heating. The color bar to the right (rendered in gray scale) indicates the temperature scale in kelvins.

FIGS. 12a-b. (a) Transmission spectra of the thermally stabilized electro-optic modulator under varying dc bias voltages. (b) Eye diagram at 1 Gbit/s. All the above measurements were performed at nominal operating temperature ($\Delta T=0$ K).

FIGS. 13a-b. (a) Transmission spectra with varying ambient temperature with no current through the device. (b) Distorted eye diagram at $\Delta T=2$ K, 1 Gbit/s. Applied ac-modulated voltage and wavelength of operation were unchanged.

FIGS. 14a-b. Simulation of the waveform distortion due to thermal effects. (a) Baseline simulations at $\Delta T=0$ K. (b) Distorted waveforms at $\Delta T=15$ K; gray curves show the electro-optic device computer simulations, and the black curves show the measured waveforms.

FIGS. 15a-c. Optical transmission eye diagrams at various thermal and bias current conditions. Eye diagrams (a) at $\Delta T=0$ K, 1.36 mA, (b) degraded at $\Delta T=15$ K, 1.36 mA, and (c) retrieved at $\Delta T=15$ K, 345 PRBS $2^9$-1 bit sequences were used for all measurements. Applied ac-modulated voltage and wavelength of operation were kept constant.

FIG. 16a-b. Temperature profiles using (a) metal strip heater and (b) direct localized waveguide heating. The gradient bar indicates the temperature scale in kelvins (K).

DETAILED DESCRIPTION OF THE INVENTION

Figure 1D:
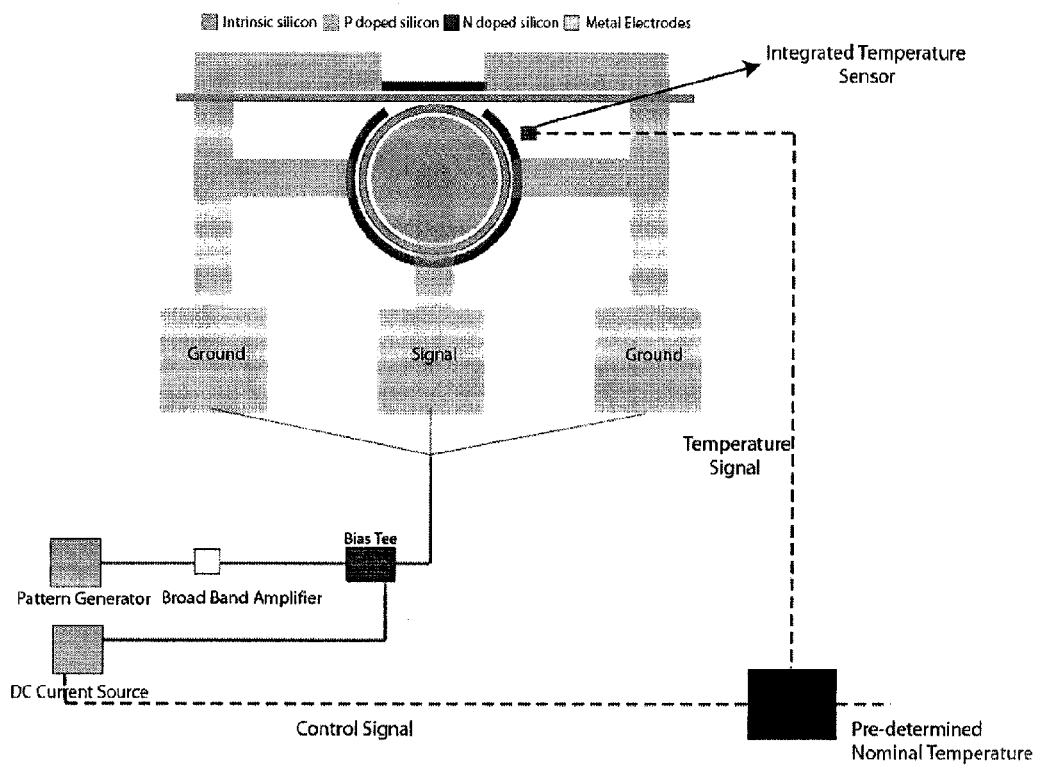

A thermally stabilized, high speed, micrometer-scale silicon electro-optic modulator (also referred to herein as a "thermally stabilized electro-optic modulator") is provided. Methods for fabricating thermally stabilized electro-optic modulators are also provided.

Methods for maintaining desired temperatures in electro-optic modulators are also provided. Methods for high bit rate electro-optic modulation using a thermally stabilized electro-optic modulator over wide temperature ranges are also provided.

In one embodiment, a method is provided for maintaining high quality modulation in the presence of thermal variations from the surroundings. Direct current injection into the thermally stabilized electro-optic modulator is used to maintain the modulation performance of the modulator. The direct injected current changes the local temperature of the thermally stabilized electro-optic modulator to maintain its operation over a wide temperature range (e.g., a range of 10, 20, 30, 40, 50, 60, 70, 80, 90 or 100 kelvins or greater). In another embodiment, the temperature range is greater than 100 kelvins. This method for wide temperature operation of a thermally stabilized electro-optic modulator on silicon is based, in one embodiment, on carrier dispersion in silicon, enhanced by a ring resonant structure and thermally stabilized by DC electric currents. Low error bit rates are achieved by varying the bias current through the thermally stabilized electro-optic modulator to thermally counteract the ambient temperature changes. The thermally stabilized electro-optic modulator can switch light at speeds exceeding 18 billion times per second.

The thermally stabilized electro-optic modulator and methods provided herein have many advantages over existing modulators and methods. The thermally stabilized electro-optic modulator provides an improved design over existing designs for ring modulators such as lithium niobate modulators, silicon mach Zender modulators and silicon ring modulators. The temperature range of electro-optic modulation in silicon photonics systems, moreover, can be increased to a range of 15 kelvins or greater (e.g., temperature ranges of 5, 10, 20, 30, 40, 50, 60, 70, 80, 90 or 100 kelvins or greater). The thermally stabilized electro-optic modulator provides robustness to virtually any electronic and/or optical device known in the art, and maintains thermal variation at a low level adequate for microelectronic integration.

The thermally stabilized electro-optic modulator is frequency selective. Hence it may be used for simultaneously modulating many optical carriers. The modulator can also enable efficient thermal tuning using the existing modulator architecture reducing the price of the lithography of the modulator.

For clarity of disclosure, and not by way of limitation, the detailed description of the invention is divided into the subsections set forth below.

5.1 Thermally Stabilized Electro-optic Modulator

A thermally stabilized, high speed, micrometer-scale silicon electro-optic modulator (also referred to herein as a "thermally stabilized electro-optic modulator") for maintaining a desired temperature is provided. In one embodiment, a thermally stabilized electro-optic modulator is provided that operates over a temperature range of 15 K. In other embodiments, the thermally stabilized electro-optic modulator can operate over temperature ranges of 5, 10, 20, 30, 40, 50, 60, 70, 80, 90 or 100 K. In another embodiment, the temperature range is greater than 100 K. The bit error rates of the modulator can be maintained at low values even when temperature of the modulator drifts over a wide range. The thermally stabilized electro-optic modulator can be used, for example, as a building block for silicon photonics. The thermally stabilized electro-optic modulator can interface electronics with photonics and can be used to create an on-chip optical network that connects thousands of nodes in an optical network.

In one embodiment, the thermally stabilized electro-optic modulator is resonator (or resonance)-based.

Resonator-based silicon electro-optic modulators are ultra compact and can be used in silicon photonics. They are scalable to ~1.5 μm radius. They consume ultra low power, having a per bit energy ~100 fJ. They have low insertion loss, i.e., <0.1 dB. Index changes are enhanced through the use the resonator. Index changes can be translated into large modulations in output power. The modulated light can then be switched on and off at a high speed.

In one embodiment, the invention provides a thermally stabilized electro-optic modulator for maintaining a desired temperature that comprises:

a resonator-based electro-optic modulator;

a temperature sensing circuit that senses the temperature of the resonator-based electro-optic modulator and provides an output indicative of the temperature; and a current controlling circuit that modulates current to the resonator-based electro-optic modulator, wherein the current controlling circuit responds to the output of the temperature sensing circuit.

The thermally stabilized electro-optic modulator can comprise any resonator-based electro-optic modulator known in the art, e.g., a ring or a disc modulator. In one embodiment, the resonator of the resonator-based electro-optic modulator is a ring resonator. In a specific embodiment, the ring resonator is embedded in a carrier injection device.

Thermally stabilized electro-optic modulators comprising a resonator-based electro-optic ring modulator can be operated at 1 Gbit/s with a quality factor of ~4000 over a 15 K temperature range.

Figure 9:
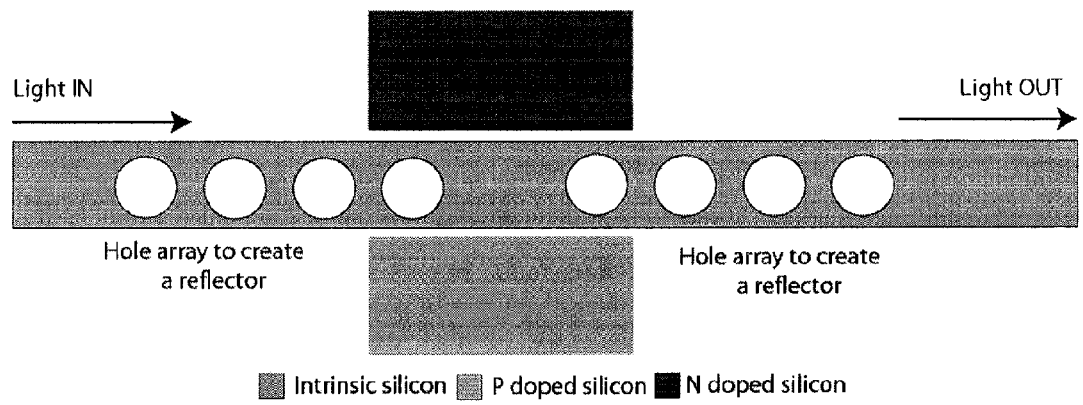
FIG. 9. Fabry Perot Cavity-Electro-optic modulator that can be used as the resonance-based electro-optic modulator in an alternate embodiment of the thermally stabilized electro-optic modulator.

In another embodiment, the resonator-based electro-optic modulator comprises a Fabry Perot cavity (FIG. 9).

FIGS. 1a-e show an embodiment of a thermally stabilized electro-optic modulator that comprises a resonator-based electro-optic ring modulator. FIG. 1a is a schematic of the electro-optic ring modulator. FIG. 1b is a cross section of the waveguide embedded in a PIN junction. The ring resonator is coupled to a waveguide, and the close-up inset of FIG. 1b shows the coupling region. FIG. 1c is a top-view scanning electron microscope (SEM) image of the ring resonator before the formation of the electro-optic modulator.

FIG. 1d shows a top view schematic of the electro-optic ring modulator with electrode positions and control loop. As is illustrated in FIG, 1d, an input signal to the electro-optic ring modulator includes: (1) a temperature control current signal; along with (2) at least one additional signal. This at least one additional signal is illustrated in FIG. 1d as a pattern generator signal (i.e., inherently different than the temperature control signal) further modified by a broad band amplifier.

5.2 Waveguides for the Resonator-based Electro-optic Modulator

The resonator-based electro-optic modulator can comprise waveguides, e.g., a straight waveguide that couples to a ring resonator and/or a waveguide that forms a ring resonator.

Figure 1E:
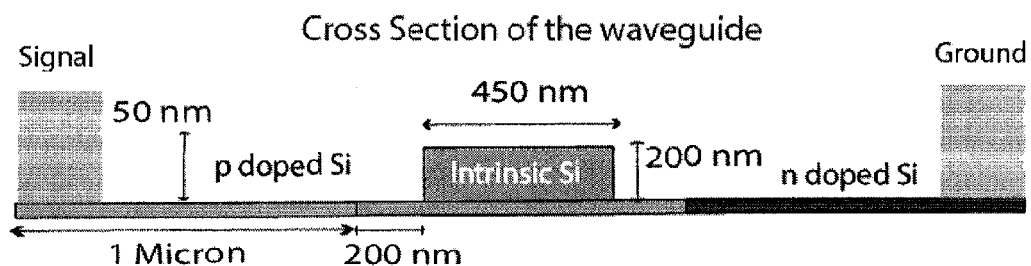

FIG. 1e shows a cross section of the waveguides, indicating electrode positions, in one embodiment of the thermally stabilized electro-optic modulator shown in FIG. 1a.

In a specific embodiment, the straight waveguide coupling to the ring resonator and/or the waveguide forming the ring resonator can have a width of 450 nm and a height of 250 nm. The diameter of the ring can be 12 μm, and the spacing between the ring and the straight waveguide can be 200 nm. To ensure high coupling efficiency between the waveguide and the incoming optical fiber, nanotapers are fabricated at the ends of the waveguide. Fabrication of nanotapers is well known in the art.

Figure 8:
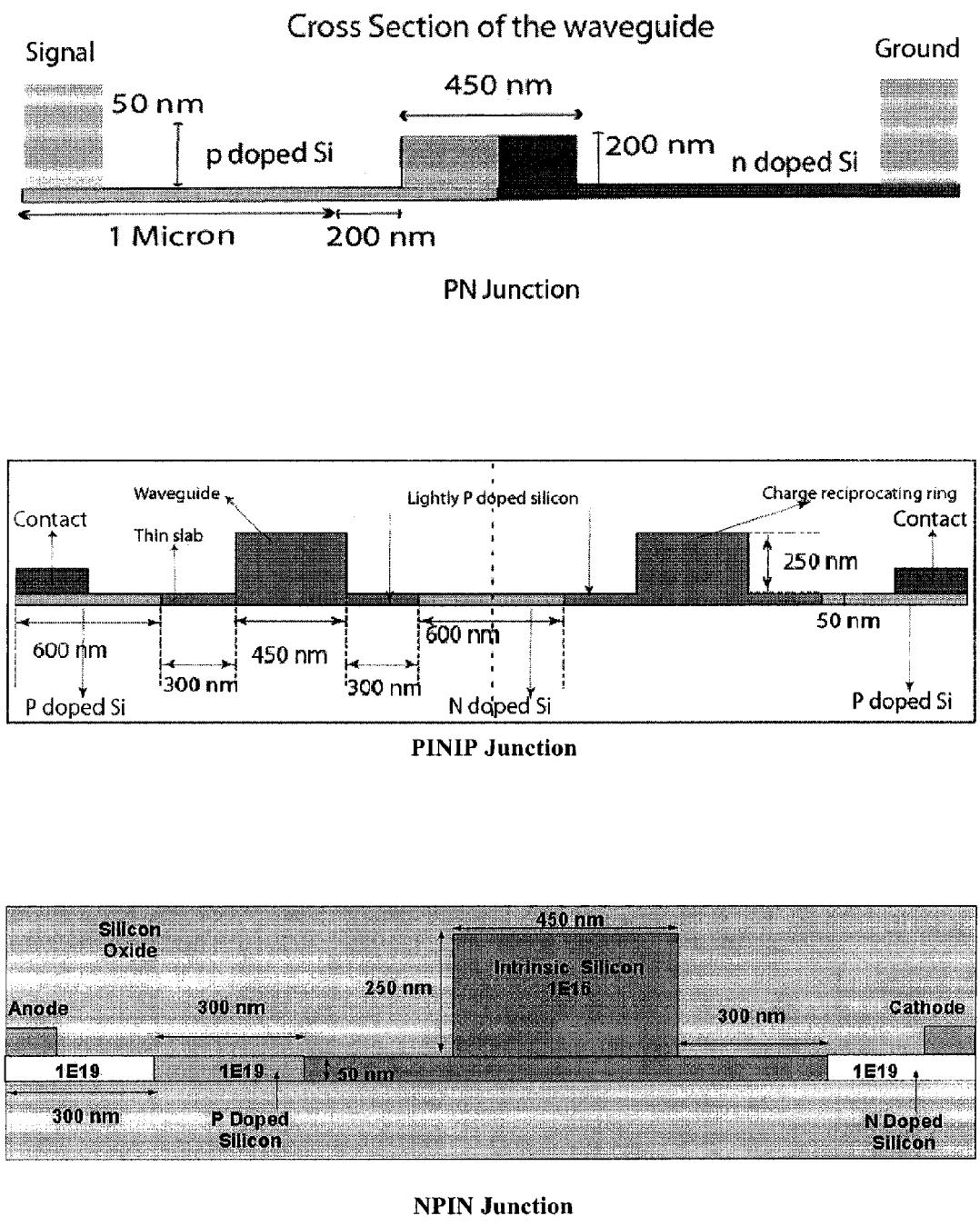
FIG. 8. Alternate doping profiles for waveguides such as PN, PINIP and NPIN junctions.

Various doping profiles can be used for the waveguides in addition to the PIN junction described above. FIG. 8 shows doping profiles for waveguides such as PN, PINIP and NPIN junctions.

5.3 Temperature Control of Modulator Through Use of Temperature Sensing Circuit and Current Control Circuit The thermally stabilized electro-optic modulator of the invention is an improvement over existing designs in that the local temperature of the modulator can be controlled in the presence of temperature variations of the surrounding chip.

The thermally stabilized electro-optic modulator comprises a temperature sensing circuit (or temperature sensor) that senses the temperature of the resonator-based electro-optic modulator and provides an output indicative of the temperature. The design of temperature sensing circuits and sensors is well known in the art and such sensors are also commercially available.

The thermally stabilized electro-optic modulator comprises a temperature sensing circuit that senses the temperature of the resonator-based electro-optic modulator and provides an output indicative of the temperature.

The thermally stabilized electro-optic modulator also comprises a current modulating (or controlling) circuit that modulates (or controls) current to the resonator-based electro-optic modulator, wherein the current modulating (or controlling) circuit responds to the output of the temperature sensing circuit. The ambient temperature is sensed using the temperature sensor and corrective measures are taken by controlling the DC bias current through the resonator-based electro-optic modulator, Ambient temperature sensors are known in the art and commercially available.

The thermally stabilized electro-optic modulator can also comprise a heat sink. In one embodiment, the temperature of the heat sink is controlled through an external temperature controller with feedback. Such heat sinks and controllers are known in the art. The Joule thermal power consumption for maintaining the base operating condition can be estimated as 3.1 pJ/bit at $\Delta T=0$ K and 200 fJ/bit at $\Delta T=15$ K. Both these values can be further reduced significantly by device optimization using methods known in the art.

In one embodiment, the ambient temperature (i.e., temperature of the ambient environment) can be controlled using a temperature controlled stage. Temperature controlled stages are well known in the art and commercially available.

The electro-optic structure of the thermally stabilized electro-optic modulator is used for thermal tuning of the modulator as well, hence avoiding the need for an extra lithography step as well as improving the efficiency of the tuning method.

Other embodiments of the thermally stabilized electro-optic modulator can comprise electronic circuits that can change their averaged voltage. The creation of such electronic circuits is known in the art. Thus in certain embodiments, the thermally stabilized electro-optic modulator can comprise a group IV, III-V or II-VI semiconductor modulator that allows for the average current to be varied.

Figure 11:
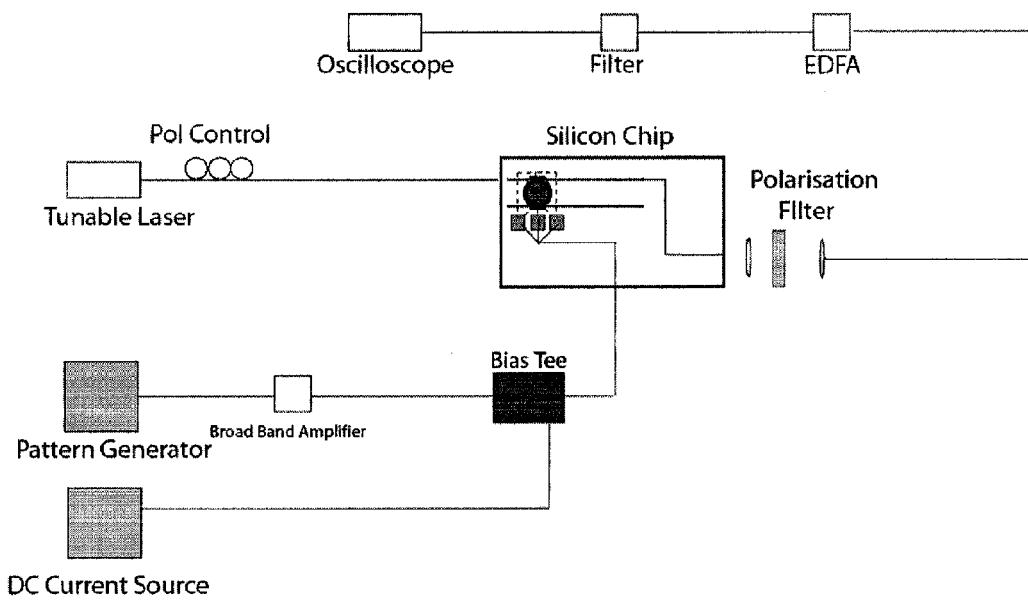
FIG. 11. Another driving scheme for an embodiment of the thermally stabilized electro-optic modulator (designated in the diagram as "Silicon Chip"). EDFA, Erbium-doped fiber amplifier. Pol Control, polarization control.

Numerous schemes for control of local temperature of a modulator can employ the thermally stabilized electro-optic modulator. FIGS. 11 and 12 give two examples of control of the local temperature of the modulator in the presence of temperature variations of the surrounding chip. In these examples, as the ambient temperature increases, the current decreases, and as the ambient temperature decreases, the current increases.

Figure 10:
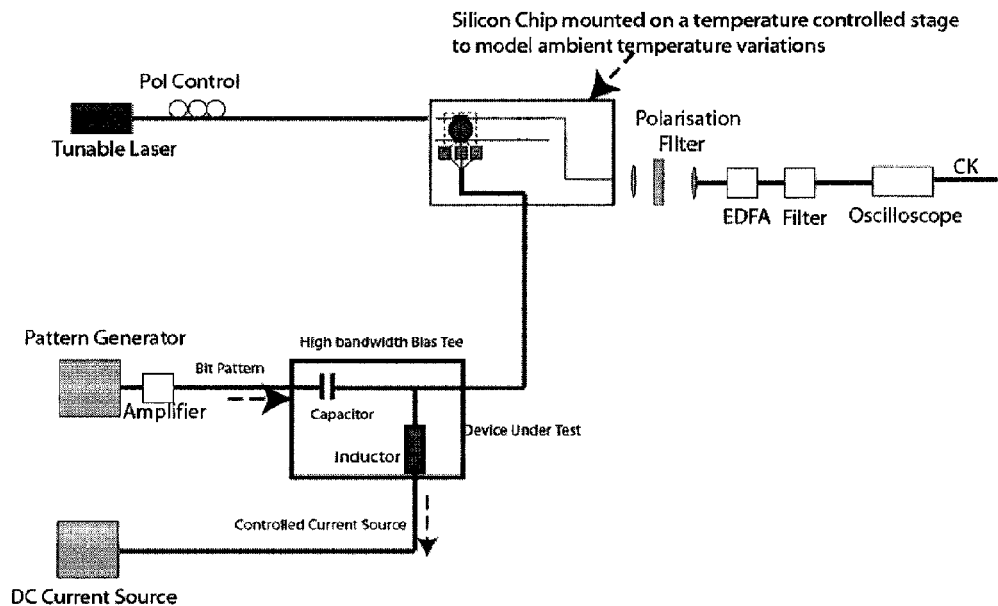
FIG. 10. Driving scheme for an embodiment of the thermally stabilized electro-optic modulator (designated in the diagram as "Silicon Chip"). In this driving scheme the thermally stabilized electro-optic modulator (silicon chip) is mounted on a temperature controlled stage. The temperature controlled stage is used in this experiment to model ambient temperature variations. Pol Control, polarization control. As the ambient temperature on the chip increases, the current decreases, and as the ambient temperature on the chip decreases, the current increases.

FIG. 10 shows an example of a driving scheme for an embodiment of the thermally stabilized electro-optic modulator (designated in the diagram as "Silicon Chip"). In this driving scheme, the thermally stabilized electro-optic modulator (silicon chip) has been mounted on a temperature controlled stage to model ambient temperature variations that may be present in the surrounding chip. Pol Control, polarization control.

FIG. 11 shows another example of a driving scheme for an embodiment of the thermally stabilized electro-optic modulator (designated in the diagram as "Silicon Chip"). EDFA, Erbium-doped fiber amplifier. Pol Control, polarization control.

5.4 Methods for Fabricating Thermally Stabilized Electro-optic Modulators

A method for fabricating a thermally stabilized electro-optic modulator is provided. The comprises the steps of:
providing a substrate;
forming a resonator-based electro-optic modulator on the substrate;
forming a temperature sensing circuit that senses the temperature of the resonator-based electro-optic modulator and provides an output indicative of the temperature, wherein the temperature sensing circuit is operatively connected to the resonator-based electro-optic modulator on the substrate; and
forming a current controlling circuit on the substrate wherein the current controlling circuit modulates current to the resonator-based electro-optic modulator in response to output of the temperature sensing circuit.

In one embodiment, the thermally stabilized electro-optic modulator is silicon based. For example, the method can comprise the steps of:
providing a silicon-on-insulator substrate with a buried oxide layer;
forming a ring;
forming a waveguide;
fabricating nanotapers at the ends of the waveguide;
depositing silicon dioxide onto the substrate; and
fabricating holes in the substrate.

In another embodiment, the method comprises creating metal contacts to access the thermally stabilized electro-optic modulator electrically.

The thermally stabilized electro-optic modulator may be fabricated, using methods known in the art, in a complementary metal oxide semiconductor, (CMOS) silicon fabrication facility. In one embodiment, the thermally stabilized electro-optic modulator can be fabricated on silicon-on-insulator substrate with an oxide layer using methods known in the art. In a preferred embodiment, the oxide layer is a 3-mm-thick buried oxide layer.

In another embodiment, the structures of the resonator-based electro-optic modulator can be defined using art known methods of electron-beam lithography followed by reactive ion plasma etching.

Following electron-beam lithography and reactive ion plasma etching of the silicon-on-insulator (or silicon) substrate, the n+ and p+ regions of the diode are each defined with photolithography using methods known in the art, and are implanted, using methods known in the art, with phosphorus and boron to create concentrations of $10^{19}/cm^3$.

A silicon dioxide layer is then deposited onto the wafer using plasma-enhanced chemical vapor deposition followed by an annealing process to activate the dopants. Such deposition and annealing methods are well known in the art.

In one embodiment a layer of 1-mm-thick silicon dioxide is deposited, e.g., for 15 s at 1,050 8C for p+ and 15 min at 900 8C for n+.

Holes can be patterned using photolithography and then etched down to the doped silicon regions, followed by evaporation and liftoff of the titanium contacts.

5.5 Methods for Controlling the Temperature of an Electro-optic Modulator

A method for maintaining a desired temperature in an electro-optic modulator is also provided. The modulator can be a semiconductor-based electro-optic modulator or an optically based electro-optic modulator. The method can comprise the steps of measuring the temperature of the electro-optic modulator;

comparing the measured temperature to the desired temperature; and modulating current through the electro-optic modulator, i.e., increasing the current through the modulator if the measured temperature is less than the desired temperature or decreasing the current through the modulator if the measured temperature is greater than the desired temperature. After a suitable interval that can be determined using methods known in the art, the above steps can be repeated.

An embodiment of the method for thermal control is illustrated in FIG. 1d. The method can comprise measuring locally the temperature of the modulator using a temperature sensor (or temperature sensing circuit) such as a micro-thermal sensor and comparing the measured temperature with a reference modulator temperature using a comparator. The difference between the measured temperature and the reference modulator temperature can be determined using methods known in the art. The difference between the measured temperature and the reference modulator temperature provides the control signal for the DC bias current. The DC bias current is modified appropriately and added to the high speed driving signal.

The measurement of the temperature can be accomplished by methods known in the art, e.g., via integrated temperature sensors implemented via thermally sensitive diodes or by using an off-chip temperature measurement scheme. The temperature can also be estimated from the output signal of the modulator.

The measured temperature is compared with the desired temperature. If the temperature measured is less than the temperature desired, the current through the modulator is increased. If the temperature measured exceeds the temperature desired, the current through the modulator is decreased. The modulator temperature can be measured once every few microseconds.

The entire control circuitry can be implemented on a silicon electronic platform or other suitable electronic substrate known in the art. An analog or digital comparator can be used to derive the signal for the current control. An on-chip DC current source can be used as a controlled current source.

To control the DC bias current through the modulator, a high speed RF signal can be added to a DC current source using a high speed bias tee. In one embodiment, a capacitor is employed, because it avoids the loading of the bit pattern generator by the DC bias supply (see FIG. 10). An inductor can be employed to isolate the DC source from the bit pattern.

The DC bias current is adjusted to counter ambient temperature changes, to maintain the desired temperature of the modulator, and to counter the effect of the temperature change for retrieving the bit pattern. The base operating condition can be set with a certain (or desired) DC current through the modulator. To maintain the modulation, as ambient temperature increases, the current can be reduced or as the ambient temperature decreases, the current can be increased.

Thus, using this method for controlling the temperature of the modulator, the modulator can be operated over a wide temperature range. The DC bias current can be varied to counter the effect of the temperature change for retrieving the bit pattern. The base operating condition can be set with a certain DC current through the modulator. The bias current can be varied in a direction opposite to the change in the ambient temperature to maintain the local temperature of the modulator.

Although the bias current can produce an index change owing to the injected carriers in the ON state, the effect of carrier dispersion owing to the bias current is absent in the OFF state. Hence, the bias current contributes only in regulating the temperature of the waveguides.

Figure 2:
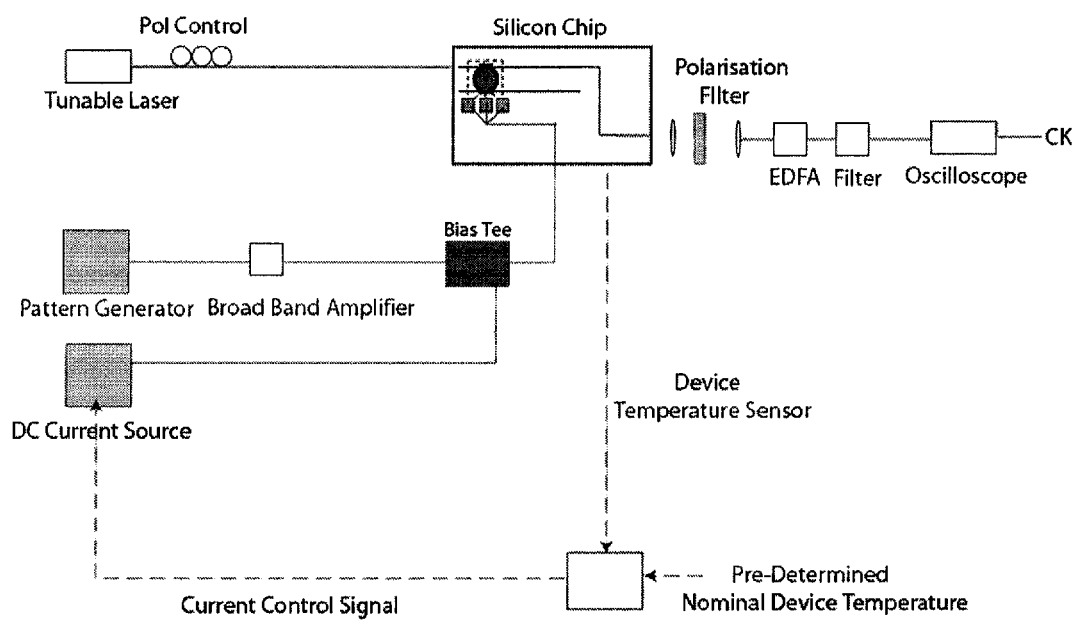
FIG. 2. Experimental setup for wide temperature operation of a resonant silicon electro-optic modulator (designated in the diagram as "Silicon Chip"). Dotted lines show the control circuitry. EDFA, Erbium-doped fiber amplifier. Pol Control, polarization control.

FIG. 2 shows one embodiment of the method for thermal control of a modulator using a thermally stabilized electro-optic modulator (designated in the figure as "Silicon Chip"). Dotted lines in the figure show the control circuitry.

5.6 Wide Temperature Range Operation of the Thermally Stabilized Electro-optic Modulator The thermally stabilized electro-optic modulator has a wide temperature range of operation. Open eye diagrams from one embodiment of the resonator-based electro-optic modulator are shown in FIGS. 3a-c. In FIGS. 3a-c, optical transmission eye diagrams are shown at various thermal and bias current conditions. Eye diagrams a) at $\Delta T=0$ K, 1.36 mA b) degraded at $\Delta T=15$ K, 1.36 mA c) retrieved at $\Delta T=15$ K, 345 µA. PRBS $2^9$-1 bit sequences were used for all measurements. Applied AC modulated voltage and wavelength of operation were kept constant.

In this embodiment, clear eye opening is observed over a 15 K range by controlling the DC bias current to maintain the local temperature of the ring at the original operating condition. The operating wavelength is kept constant at 1553.98 nm. The quality factor of the eye diagrams $Q=|\mu_2-\mu_1|/(\sigma_2+\sigma_1)$ is estimated to be 11.35 at the nominal operating temperature. The retrieved quality factor at $\Delta T=15$ K is 7.15. These Q values are sufficient for a BER of $10^{-12}$. The rise and fall times are ~300 ps. A $2^9$-1 Non-Return-to-Zero (NRZ) Pseudo Random Bit Sequence (PRBS) was used for this embodiment. The predicted thermal time constants are of the order of µs (Tc). Hence the effect of the length of longest sequence of ones or zeros will be significant for PRBS signals with more than (Tc/Bit period) consecutive 1s or 0s. This limitation becomes less stringent as the bit rate is increased. Similar run length limitations are common in various digital encoding schemes such as 8b/10b.

5.7 Comparison of Method for Thermal Control Using the Thermally Stabilized Electro-optic Modulator with Traditional Temperature Control Methods The power efficiency of the local temperature control method provided herein has been compared with the commonly used metal strip heater method. Two dimensional heat flow was used, which takes into consideration conduction of heat to the substrate and the radiative heat loss though the top surface of the chip. The thermal modeling was carried out in COMSOL. The loss through the top surface was modeled via the Stefan-Boltzman law with emissivity factors of 0.94 for SiO2 and 0.33 for the smooth metal layer. The bottom of the wafer was assumed to be the heat sink and maintained at 300 K ($T_{amb}$). A 3 µm buried oxide layer and 1 µm top cladding oxide was also assumed. The top cladding layer was chosen to be 1 µm so that the heating due to the metal layers was optimal while limiting the optical losses due to mode overlap with metal.

FIGS. 4a-b show temperature profiles using a) metal strip heater and b) direct localized waveguide heating. The color bar to the right (rendered in gray scale) indicates the temperature scale in kelvins (K).

The direct localized heating inside the waveguide was significantly more efficient than a metal heater on top of the modulator for tuning resonances. The two dimensional thermal simulations show that the temperature difference produced by direct localized heating using the PIN structure was significantly larger than metal-strip-heater method (see FIGS. 4a-b). A heat source of 1 mW/μm³ localized within the metal layer of the waveguide was assumed, to compare the efficiency of both methods. It was also assumed that the metal heaters were perfectly aligned with the waveguides for optimal heating. A comparison was made of the temperature difference ($\Delta T=T_{local}-T_{amb}$) at the center of the waveguide produced by both methods. The direct localized heating using PIN structure produces $\Delta T=40.1$ K/(mW/μm³) (FIG. 4b) while a metal heater positioned on top produces $\Delta T=21.3$ K/(mW/μm³) (FIG. 4a). Hence, the simulations show that the direct localized heating method is approximately twice as efficient as the metal heater.

An added advantage of using the direct localized heating method technique is that it requires fewer fabrication steps as it makes use of the existing structure (i.e., the contacts of the PIN device) to achieve thermal tuning.

Figure 5:
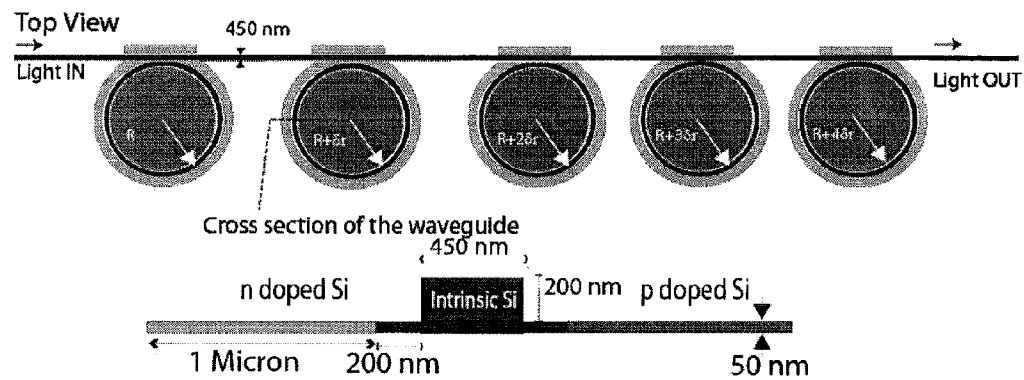
FIG. 5. A cascade of silicon micro ring resonators can be employed in the thermally stabilized electro-optic ring modulator to extend the operating temperature range to hundreds of kelvins to achieve large robustness of response to environmental conditions.

5.8 Embodiment of Thermally Stabilized Electro-optic Modulators that Operates in Extended Temperature Range The temperature range of operation of the thermally stabilized electro-optic modulator can be extended by a factor of 4 to 5 (i.e., to ~100 K) by utilizing a series ("cascade") of resonant electro-optic modulators that vary slightly in their resonant center frequencies (FIG. 5). In specific embodiments, the temperature range is 100 K, 150 K, 200 K or greater than 200 K.

In one embodiment, a thermally stabilized electro-optic modulator is provided comprising:

a plurality of resonator-based electro-optic modulators;

a temperature sensing circuit that senses the temperature of each of the plurality of resonator-based electro-optic modulators and provides an output indicative of temperature; and a current controlling circuit that modulates current to each resonator-based electro-optic modulator of the plurality, wherein the current controlling circuit responds to the output of the temperature sensing circuit.

FIG. 5 shows that a cascade of thermally stabilized electro-optic modulators comprising ring modulators that can be used to extend the operating temperature range to hundreds of kelvins to achieve large robustness to environmental conditions. In certain embodiments, the temperature range is 1 to 10 kelvins or 10 to 100 kelvins. In other embodiments, the temperature range is 1, 5, 10, 20, 30, 40, 50, 60, 70, 80, 90 or 100 kelvins or greater.

In one embodiment, the radii of the ring resonators are chosen such that the resonant wavelengths are separated from each other by a nominal wavelength of 0.2 nm, which corresponds to a temperature change of 20 K.

Figure 6:
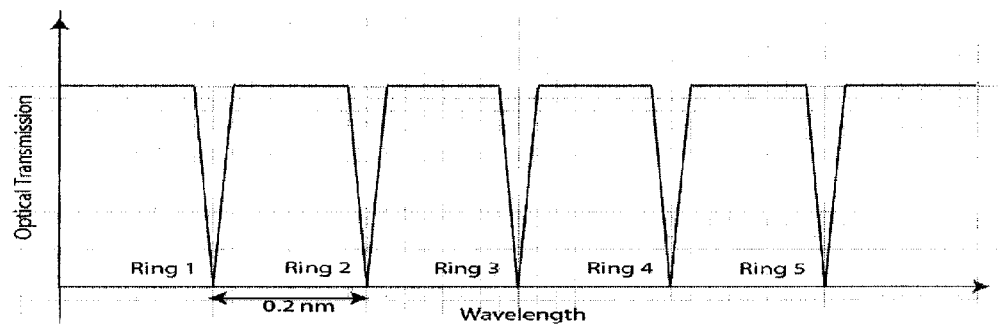
FIG. 6. Optical transmission spectrum of five cascaded ring resonators separated in wavelength nominally by 0.2 nm (wavelength shift corresponding to a nominal 20 K temperature range for each modulator).

Owing to silicon's thermo-optic effect, for every 20 K change in temperature, a new ring becomes resonant with the wavelength of operation as shown in FIG. 6. FIG. 6 shows the optical transmission spectrum of five cascaded rings separated in wavelength nominally by 0.2 nm (wavelength shift corresponding to a nominal 20 K temperature range for each modulator). For each 20 K temperature range, the local temperature tuning method described above can be used to maintain the operation of the modulator.

Figure 7:
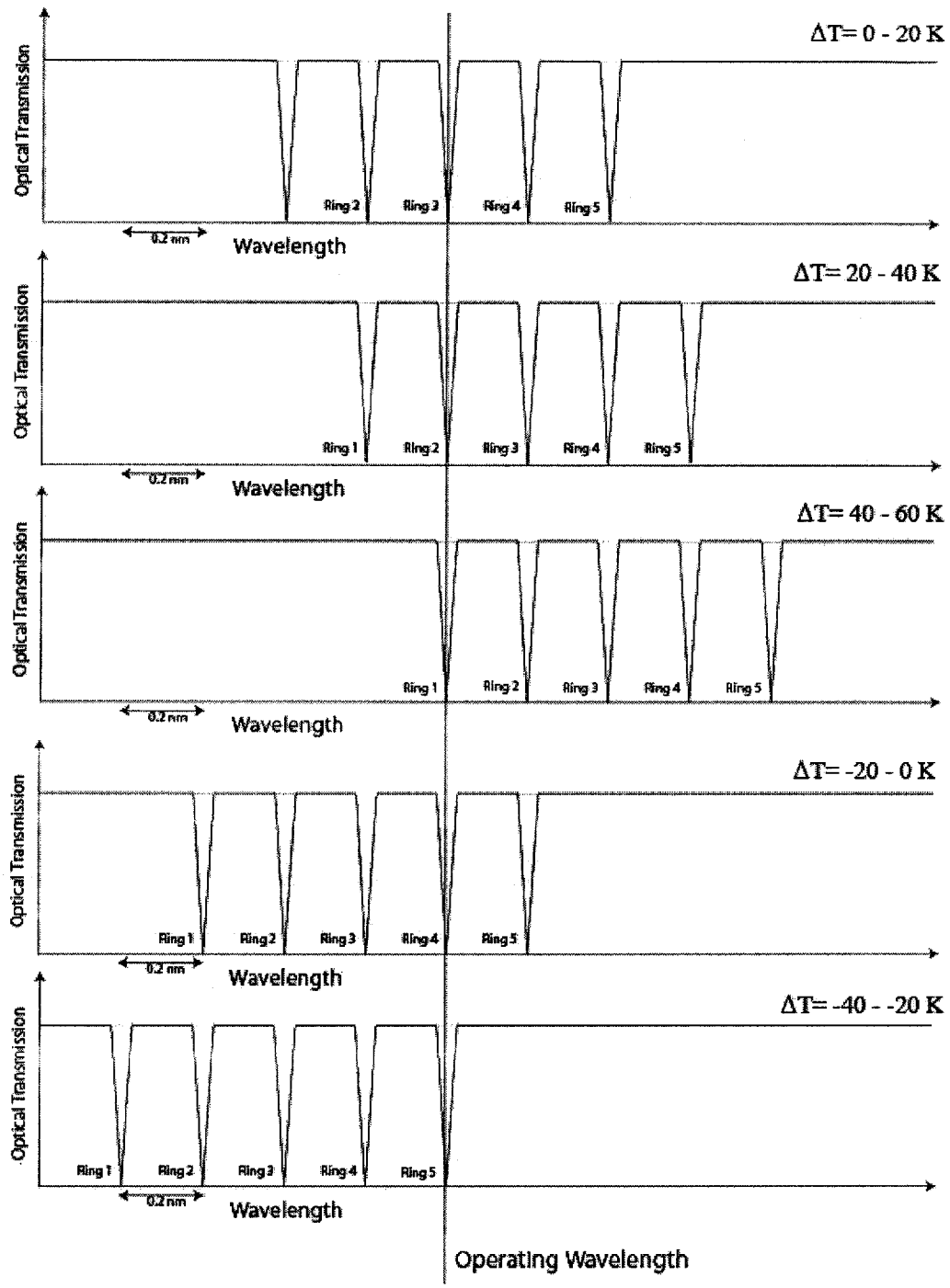
FIG. 7. Optical transmission spectra of five cascaded ring resonators separated in wavelength nominally by 0.2 nm as ambient temperature shift varies over a −40 K to 60 K range. At intervals of 20 K, a new ring becomes resonant with the operating wavelength. Each ring provides a 20 K range operation as described earlier.

FIG. 7 shows optical transmission spectra of five cascaded rings separated in wavelength nominally by 0.2 nm as ambient temperature shift varies over a −40 K to 60 K range. At intervals of 20 K, a new ring becomes resonant with the operating wavelength. Each ring provides a 20 K range operation as described earlier.

5.9 Uses for the Thermally Stabilized Electro-optic Modulator and for Methods Based Thereon The thermally stabilized electro-optic modulator is an improvement over prior art devices because the modulator employs methods of electronic control that achieve robustness for optical switches/modulators. The power consumption and footprint size allow scaling the thermally stabilized electro-optic modulator to links of terabit/s.

Owing to its compact size and frequency selectiveness, the thermally stabilized electro-optic modulator can be integrated into silicon microchips enabling data rates exceeding 100 billion bits per second per interconnect with multiple channels. The thermally stabilized electro-optic modulator can be used for intra chip, chip-chip, rack-rack and long haul data transmission as part of an electronic, photonic or electro-optic chip. The thermally stabilized electro-optic modulator can be used either as a stand-alone modulator or as an integrated circuit element. The thermally stabilized electro-optic modulator can be used for maintaining a desired temperature in any electronic or optical device known in the art, e.g., semiconductors, sensors, etc.

The thermally stabilized electro-optic modulator can also be used in optical systems requiring fast changes in index for applications such as wavelength conversion, optical delay, slow light, tunable optical filters, broad-band optical amplifiers, optical routers and switches.

As disclosed hereinabove, the footprint of the thermally stabilized electro-optic modulator is very small (in certain embodiment, in the range of 1-5 μm radius or 1-10 μm diameter), which gives large bandwidth/μm².

The thermally stabilized electro-optic modulator consumes less power. For example, the thermally stabilized electro-optic modulator that comprises a ring modulator consumes about 500-fold lower power owing to smaller radius of the ring that can be achieved (e.g., 2.5 μm radius).

The following examples are offered by way of illustration and not by way of limitation.

EXAMPLE 6.1 Example 1

Wide Temperature Range Operation of Micrometer-scale Silicon Electro-optic Modulators This example demonstrates high bit rate electro-optic modulation in a resonant micrometer-scale silicon modulator over an ambient temperature range of 15 K. Low bit error rates can be achieved by varying the bias current through the device to thermally counteract the ambient temperature changes. Robustness in the presence of thermal variations can enable a wide variety of applications for dense on chip electronic photonic integration.

This example also demonstrates that the effect of thermal variations on resonant electro-optic modulators can be locally compensated by adjusting the bias current passing through the device. The bias current through the device was varied to compensate for changes in the ambient temperature that affect the resonator. Low bit error rate (BER) modulation was maintained over a temperature range of 15 K. Robustness in the presence of environmental conditions, such as thermal variation, can enable a wide variety of applications in low-cost complementary metal-oxide semiconductor (CMOS) systems.

The embodiment of the thermally stabilized electro-optic modulator demonstrated in this example was a silicon electro-optic ring modulator fabricated on a silicon-on-insulator (SOI) substrate. The modulator was formed by building a p-i-n junction around a ring resonator with a quality factor of ~4000 and a diameter of 10 µm. The structure of the electro-optic device is shown in FIGS. 1a-b. The transmission spectrum for quasi-TM polarized light (major electric field component perpendicular to the plane of silicon) is shown in FIG. 12a. At a constant temperature, the optical transmission through the ring was modulated using a nonreturn-to-zero (NRZ) bit sequence at 1 Gbit/s. The refractive index of the ring was modulated by active carrier injection and extraction using the p-i-n diode junction. The modulated output waveform and eye diagram at 1 Gbit/s at a nominal temperature of operation (298 K) is shown in FIG. 12b. An on-off extinction ratio (ER) of 5 dB was measured in accordance with the transmission characteristics with a ±4 V applied voltage. The high applied voltage was attributed to a large contact resistance of the device (1.7 kΩ) that can be greatly reduced by optimizing the fabrication process using methods known in the art (W. L. Yang, T. F. Lei, and C. L. Lee, Solid-State Electron. 32, 997 (1989)). The power consumption was estimated as 4.52 pJ/bit with an estimated carrier lifetime of 500 ps and an injection level of $5 \times 10^{17}$ cm$^{-3}$ and taking into account both the switching and the state holding power. The power consumption can be further reduced to ~200 fJ/bit by lowering the drive voltage (W. L. Yang, T. F. Lei, and C. L. Lee, Solid-State Electron. 32, 997 (1989)) and the device radius.

The effect of temperature shift on the silicon electro-optic modulator was analyzed over a temperature range of 15 K. The thermo-optic coefficient (TOC) of silicon is given by $\Delta n/\Delta T = 1.86 \times 10^{-4} K^{-1}$, which leads to a resonance shift of ~0.11 nm/K from the base resonant wavelength. The large value of TOC of silicon can be attributed to the strong temperature dependence of the bandgaps of silicon (Y. P. Varshni, Physica (Amsterdam) 34, 149 (1967)). FIG. 13a shows the spectral shift as the temperature of the chip is varied over 4 K. FIG. 13b shows the distorted eye diagrams under a 2 K temperature shift. The effect of thermal shift on the modulated waveforms was compared with electro-optic simulations and showed a good match between simulation and experiment as shown in FIG. 14a. A description of the electro-optic modeling is known in the art and is disclosed in S. Manipatruni, Q. Xu, and M. Lipson, Opt. Express 15, 13035 (2007). The simulated and measured waveforms with a 15 K shift in temperature are shown in FIG. 14b.

To enable a wide temperature operation of resonant silicon electro-optic modulators, local thermal control of the waveguide temperature was implemented by changing the bias current through the device. The nominal operating condition of the modulator was first set using a dc bias current, and as the ambient temperature varied, the dc bias current was varied to maintain the local temperature of the device at the original value. As the bias current of the p-i-n junction varied, the heat generated in the waveguides allowed control over the local temperature of the waveguide forming the resonator.

Using this control technique, a wide temperature range, 15 K, operation of the resonant silicon electro-optic modulator was demonstrated. To control the dc bias current through the device, the high-speed rf signal was added to a dc current source using a bias tee. A capacitor of 20 nF was employed to avoid the loading of the bit pattern generator by the dc bias supply, and an inductor of 1 mH was employed to isolate the dc source from the bit pattern. The dc bias current was varied to counter the effect of the temperature change for retrieving the bit pattern. The base operating condition was set with a 1.36 mA dc current through the device with a 0.2 V bias voltage. The current was reduced to 345 µA (with a 2.2 V bias voltage) to maintain the modulation when the ambient temperature was raised by 15 K. The current measured was the time averaged extraction current during the reverse bias of the device. Even though the bias current produced an index change due to the injected carriers in the on state, the effect of carrier dispersion due to the bias current was absent in the off state. Hence, the bias current was contributing only in regulating the temperature of the waveguides. The temperature of the heat sink was controlled through an external temperature controller with feedback. The joule thermal power consumption for maintaining the base operating condition was estimated as 3.1 pJ/bit at $\Delta T=0$ K and 200 fJ/bit at $\Delta T=15$ K. Both of these values can be further reduced significantly by device optimization using standard methods known in the art.

Open eye diagrams are shown in FIGS. 15a-c. The open eye diagrams have a clear eye opening over 15 K by controlling the dc bias current to maintain the local temperature of the ring at the original operating condition. The operating wavelength was kept constant at 1553.98 nm. The quality factor of the eye diagrams, $Q=|\mu_2-\mu_1|/(\sigma_2+\sigma_1)$, was estimated to be 11.35 at the nominal operating temperature. The retrieved quality factor at $\Delta T=15$ K was 7.15. These Q values were sufficient for a BER of $10^{-12}$ (I. Shake, H. Tikara, and S. Kawanishi, J. Lightwave Technol. 22, 1296 (2004)). The rise and fall times were ~300 ps. A $2^9-1$ NRZ pseudorandom bit sequence (PRBS) was used for these experiments. The predicted thermal time constants (Tc) were of the order of microseconds. Hence the effect of the length of the longest sequence of ones or zeros will be significant for PRBS signals with more than (Tc/bit period) consecutive ones or zeros. For example, at 1 Gbit/s with a Tc of 1 us the PRBS length is limited to hundreds of consecutive bits. Similar run length limitations are common in digital encoding schemes, such as 8b/10b (A. X. Widmer, and P. A. Franaszek, IBM J. Res. Dev. 27, 440 (1983)). This limitation becomes less stringent as the bit rate is increased.

The power efficiency of the local temperature control method was compared with the commonly used metal strip heater method. Two-dimensional heat flow was used, which takes into consideration conduction of heat to the substrate and the radiative heat loss through the top surface of the chip. The thermal modeling was carried out in a multiphysics finite-element simulator using methods known in the art. The loss through the top surface was modeled via the Stefan-Boltzman law with emissivity factors of 0.94 for $SiO_2$ and 0.33 for the smooth metal layer. The bottom of the wafer as the heat sink was assumed to be maintained at 300 K ($T_{amb}$). A 3 µm buried oxide layer and 1 µm top cladding oxide was also assumed. The top cladding layer was chosen to be 1 µM so that the heating due to the metal layers was optimal while limiting the optical losses due to mode overlap with metal (F. Gan, T. Barwicz, M. A. Popovic, M. S. Dahlem, C. W. Holzwarth, P. T. Rakich, H. I. Smith, E. P. Ippen, and F. X. Kartner, in *Proceedings of the IEEE/LEOS Photonics in Switching* (IEEE, 2007), pp. 67-68). A heat source of 1 mW/µm$^3$ localized within the metal layer or the waveguide was assumed to compare the efficiency. It was also assumed that the metal heaters were perfectly aligned with the waveguides for optimal heating. The simulations showed that the temperature difference produced by direct localized heating using the p-i-n structure was significantly larger than the metal strip heater method (see FIGS. 16a-b). The temperature difference ($\Delta T=T_{local}-T_{amb}$) at the center of the waveguide produced by both methods was compared. The direct localized heating using a p-i-n structure produced $\Delta T=40.1$ K/(mW/µm$^3$) (FIG. 16b), while a metal heater positioned on top produced $\Delta T=21.3$ K/(mW/µm$^3$) (FIG. 16a). Hence, the simulations showed that the direct localized heating method was approximately twice as efficient as the metal heater. An added advantage of using the direct localized heating method technique was that it required fewer fabrication steps as it made use of the existing structure (i.e., the contacts of the p-i-n device) to achieve thermal tuning. The use of CMOS compatible low power consumption temperature sensors is a common practice in the microprocessor industry (A. Naveh, E. Rotem, A. Mendelson, S. Gochman, R. Chabukswar, K. Krishnan, and A. Kumar, Intel Technol. J. 10, 109 (2007)). Using efficient sensors, the energy for sensing can be as small as 10 fJ/bit. Moreover, since the time response of thermal effects was relatively slow ($T_c \approx \mu s$), a relatively crude temperature sensor can be integrated for achieving a wide temperature operation of resonantly enhanced modulators. In summary, this example demonstrates a wide temperature range operation of resonant micrometer scale modulators while ensuring high-speed operation. Low bit error rate waveforms were demonstrated over a 15 K range while maintaining a bit rate of 1 Gbit/s. In light of the recent demonstration of high speed, low insertion loss, and small footprint (18 Gbits/s, <1 dB, 10 µm) modulators (S. Manipatruni, Q. Xu, B. Schmidt, J. Shakya, and M. Lipson, in *Proceedings of the Lasers and Electro-Optics Society* (*LEOS* 2007) (IEEE, 2007), p. 537), the wide temperature range operation of resonant compact electro-optic modulators has significant impact for the large scale integration of compact modulators for dense on chip optical networks.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A thermally stabilized electro-optic modulator for maintaining a desired temperature, comprising:
    a resonator-based electro-optic modulator;
    a temperature sensing circuit that senses the temperature of the resonator-based electrooptic modulator and provides an output indicative of the temperature; and
    a current controlling circuit that modulates a temperature control current signal applied along with at least one additional signal to the resonator-based electro-optic modulator, wherein the current controlling circuit is responsive to the output of the temperature sensing circuit.

2. The thermally stabilized electro-optic modulator of claim 1, wherein the current controlling circuit responds to the output of the temperature sensing circuit by increasing current as the temperature decreases to maintain the desired temperature or by decreasing current as the temperature increases to maintain the desired temperature.

3. The thermally stabilized electro-optic modulator of claim 1 that operates over temperature ranges of 10, 20, 30, 40, 50, 60, 70, 80, 90, or 100° K.

4. The thermally stabilized electro-optic modulator of claim 1, wherein the resonator-based electro-optic modulator comprises a ring or a disc resonator.

5. The thermally stabilized electro-optic modulator of claim 1, wherein the resonator-based electro-optic modulator comprises a Fabry Perot cavity.

6. The thermally stabilized electro-optic modulator of claim 1, further comprising a waveguide optically coupled with the resonator-based electro-optic modulator.

7. The thermally stabilized electro-optic modulator of claim 6, wherein a doping profile for the waveguide is a PIN junction.

8. The thermally stabilized electro-optic modulator of claim 6, wherein a doping profile for the waveguide is a PN, PINIP or NPIN junction.

9. The thermally stabilized electro-optic modulator of claim 1, wherein the current controlling circuit modulates current by controlling a DC bias temperature control current signal through a ring waveguide portion of a ring resonator-based electro-optic modulator.

10. The thermally stabilized electro-optic modulator of claim 1 wherein:
    the electro-optic modulator comprises a ring resonator electro-optic modulator; and
    the temperature control current signal and the at least one additional signal is applied across a ring waveguide within the ring resonator electro-optic modulator.

11. A thermally stabilized electro-optic modulator comprising:
    a plurality of resonator-based electro-optic modulators;
    a temperature sensing circuit that senses the temperature of each of the plurality of resonator-based electro-optic modulators and provides an output indicative of temperature; and
    a current controlling circuit that modulates a temperature control current signal applied along with at least one additional signal to each resonator-based electro-optic modulator of the plurality, wherein the current controlling circuit responds to the output of the temperature sensing circuit.

12. The thermally stabilized electro-optic modulator of claim 11 wherein:
    the electro-optic modulator comprises a plurality of ring resonator electro-optic modulators; and
    the temperature control current signal and the at least one additional signal is applied across a plurality of ring waveguides within the plurality of ring resonator electro-optic modulators.

13. The thermally stabilized electro-optic modulator of claim 11, wherein the plurality of resonator-based electro-optic modulators is a series of micro-ring resonators of different radii, wherein the resonant wavelength of each micro-ring resonator in the series is separated from resonant wavelength of other micro-ring resonators in the series by a wavelength that corresponds to a specified or desired increment of temperature change.

14. The thermally stabilized electro-optic modulator of claim 13, wherein the separating wavelength is 0.2 nm and the increment of temperature change is 20° K.

15. A method for fabricating a thermally stabilized electro-optic modulator, comprising the steps of:
    providing a substrate;
    forming a resonator-based electro-optic modulator on the substrate;
    forming a temperature sensing circuit that senses the temperature of the resonator-based electro-optic modulator and provides an output indicative of the temperature, wherein the temperature sensing circuit is operatively connected to the resonator-based electro-optic modulator on the substrate; and forming a current controlling circuit on the substrate wherein the current controlling circuit modulates a temperature control current signal applied along with at least one additional signal to the resonator-based electro-optic modulator in response to output of the temperature sensing circuit.

16. The method of claim 15, wherein:
the providing the substrate includes providing a silicon-on-insulator substrate with a buried oxide layer;
the forming the resonator-based electro-optic modulator on the substrate includes:
   forming a ring on the substrate;
   forming a waveguide optically coupled with the ring and also on the substrate;
   fabricating nanotapers at the ends of the waveguide;
   depositing silicon dioxide onto the substrate including the ring and the waveguide; and
   fabricating holes in the silicon dioxide to reach the substrate.

17. The method of claim 15, comprising forming metal electrical contacts on the thermally stabilized electro-optic modulator.

18. The method of claim 15 wherein:
the electro-optic modulator comprises a ring resonator electro-optic modulator; and
the temperature control current signal and the at least one additional signal is applied across a ring waveguide within the ring resonator electro-optic modulator.

19. A method for maintaining a desired temperature in an electro-optic modulator, comprising the steps of:
a) measuring the temperature of the electro-optic modulator;
b) comparing the measured temperature to the desired temperature; and
c) modulating a temperature control current signal applied along with at least one additional signal through the electro-optic modulator.

20. The method of claim 19, wherein steps a-c are repeated at least once.

21. The method of claim 19, wherein the step of modulating the temperature control current signal comprises increasing the temperature control current through the electro-optic modulator, provided that the measured temperature is less than the desired temperature, or decreasing current through the electro-optic modulator provided that the measured temperature is greater than the desired temperature.

22. The method of claim 21, wherein steps a-c are repeated at least once.

23. The method of claim 19 wherein:
the electro-optic modulator comprises a ring resonator electro-optic modulator; and
the temperature control current signal and the at least one additional signal is applied across a ring waveguide within the ring resonator electro-optic modulator.

* * * * *